Sept. 7, 1948.　　　　A. P. SCHNYDER　　　　2,448,689
DEBARKING APPARATUS
Filed Oct. 16, 1944　　　　　　　　　　　　4 Sheets-Sheet 1
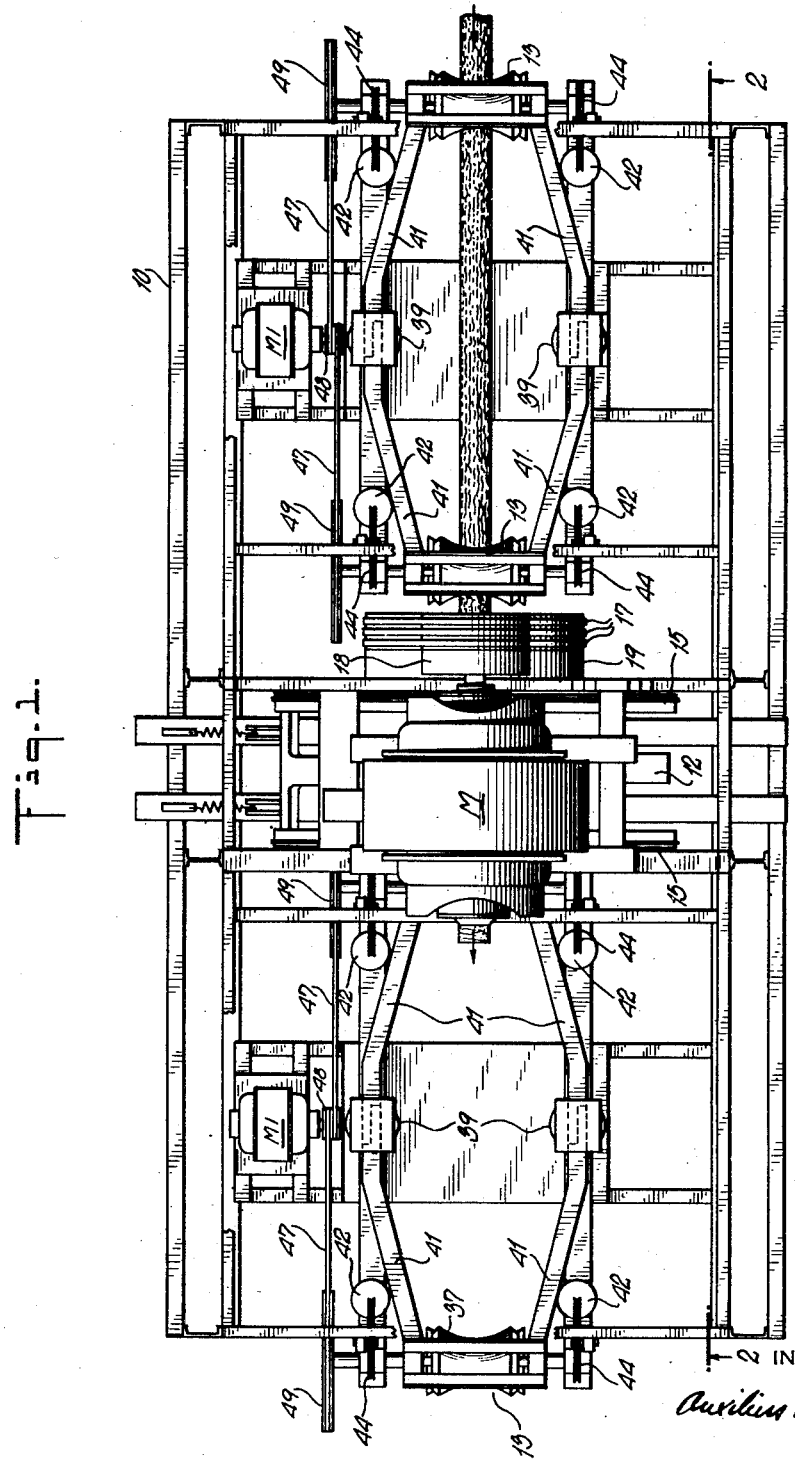
INVENTOR
Aurelius P. Schnyder

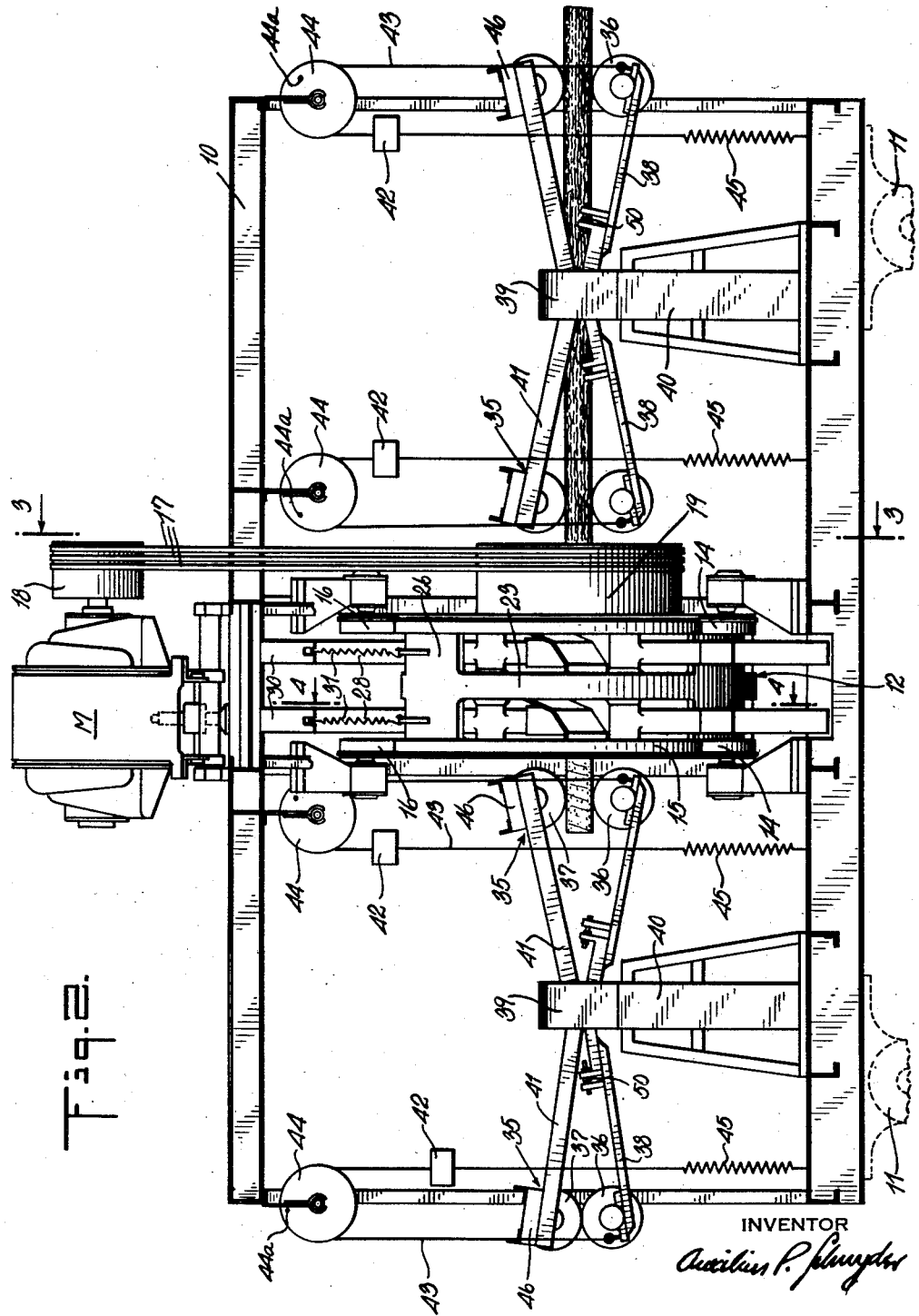

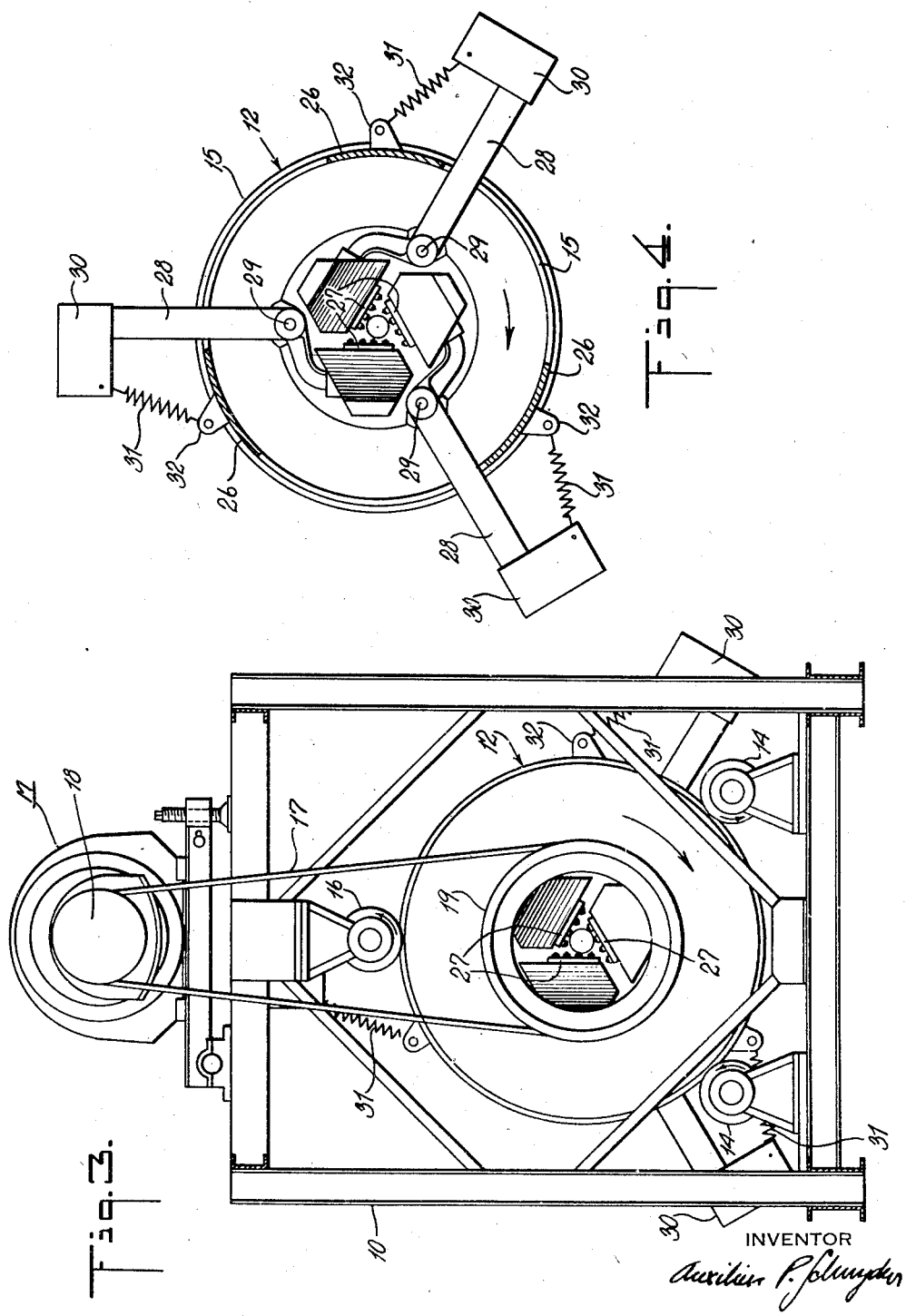

Sept. 7, 1948.  A. P. SCHNYDER  2,448,689
DEBARKING APPARATUS
Filed Oct. 16, 1944  4 Sheets-Sheet 4
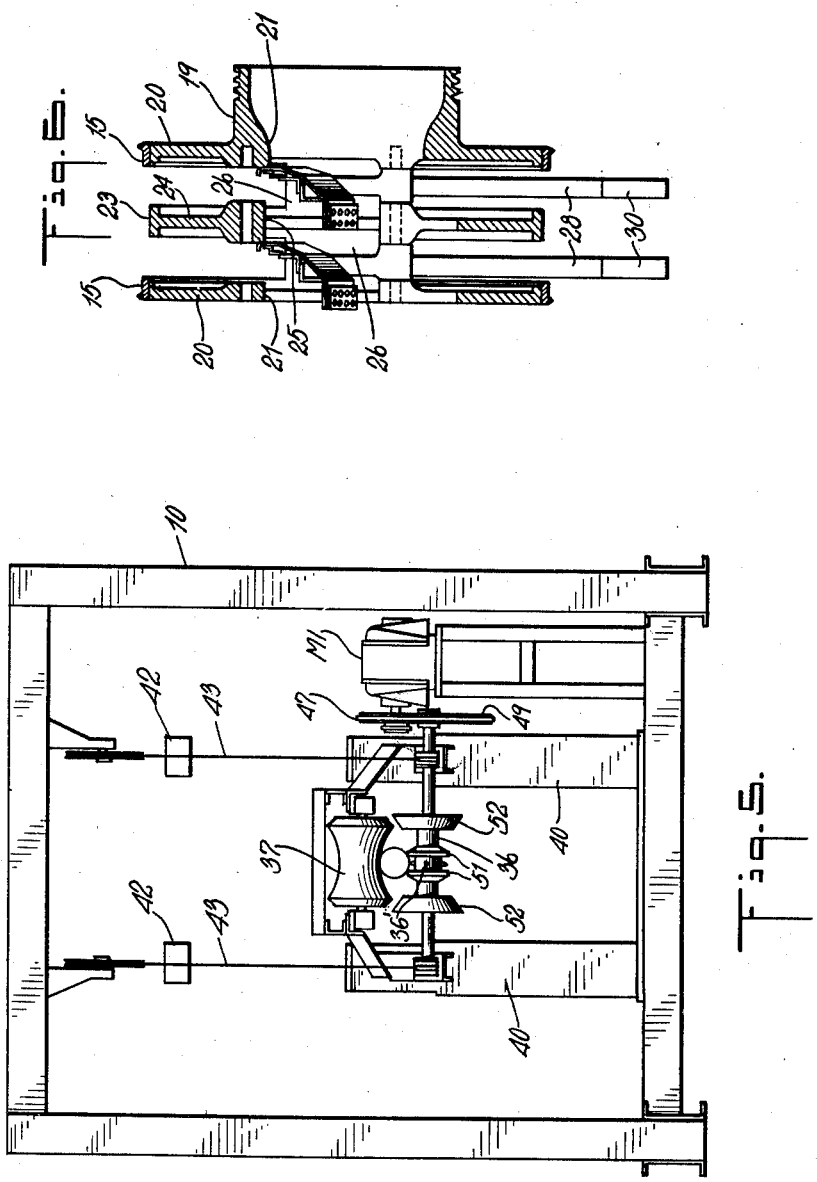
INVENTOR
Aurilius P. Schnyder Patented Sept. 7, 1948

2,448,689

UNITED STATES PATENT OFFICE 2,448,689

DEBARKING APPARATUS

Auxilius P. Schnyder, Teaneck, N. J.

Application October 16, 1944, Serial No. 558,810

4 Claims. (Cl. 144—208)

This invention relates to a de-barking or rossing apparatus and has for an object the provision of improvements in this art.

Among the particular objects are the provision of a de-barker which will operate very rapidly and remove bark cleanly without undue injury to the wood; which will guide and feed the logs properly to and from the de-barking instruments; which will effectively dispose of the bark as rapidly as it is removed; and which will readily accommodate logs of various sizes and shapes, even if very crooked and knotty.

The objects and features of the invention will be apparent from the following description of an exemplary embodiment, reference being made to the accompanying drawings thereof, wherein:

Fig. 1 is a top plan view;

Fig. 2 is a vertical section taken on the line 2—2 of Fig. 1;

Fig. 3 is a transverse section taken on the line 3—3 of Fig. 2;

Fig. 4 is a partial section taken on the line 4—4 of Fig. 2;

Fig. 5 is an end elevation; and

Fig. 6 is an axial section through the drum to show the de-barking instruments.

The operating mechanism is mounted on a substantial frame 10 which, as shown in dotted lines in Fig. 2, may be provided with wheels 11 adapting it for transportation to desired locations, as by being towed or loaded upon a trailer.

The operating mechanism comprises a rotary drum or barrel 12, which carries the de-barking instruments, and stock feed-guide devices 13 at each end of the drum.

The drum 12 is mounted on supporting trunnions 14, the drum having annular tracks or bands 15 which ride and guide upon the trunnions, and the drum is held down upon the trunnions by resilient pressure rolls 16 which also ride and guide upon the tracks or bands 15. The space between the tracks and trunnions is open for the passage of operating mechanism carried by the drum and for the passage of bark outward through the openings.

Means are provided for rotating the drum, the means shown herein comprising a motor M mounted above the drum where it is free from debris, the motor driving through one or more belt strands 17 passing over a grooved pulley 18 on the shaft of the motor and a pulley 19 provided on one end of the drum.

As shown in Fig. 6, the drum is a skeleton device wherein the tracks 15 near each end are connected by radial elements 20 with interior tubular elements 21, one of which carries the tubular pulley hub 19. Between the track portions there is an intermediate disk-like element 23 having a radial portion 24 and an inner tubular portion 25, the outer or rim portion of element 23 and the tracks 15 being connected by circumferentially spaced axially extending strips 26. The openings between these strips 26 provide operating space for the de-barking instruments as well as for the outward passage of the bark removed.

Within the drum a plurality of coaxial sets of debarking instruments 27 are secured on radial arms 28 pivoted upon pins 29 on the inner tubular portion 25 of the drum. The arms 28 extend out through openings in the drum and at the outer ends carry centrifugal weights 30. The weights act partly by centrifugal force and partly by inertia to place a resilient pressure on the debarking instruments acting radially inward toward the axis of the drum along which the logs pass. The instruments are further urged inward by springs 31 secured between the arms and anchorages 32 on the drum. In the present embodiment there are two sets of de-barking instruments and three instruments in each coaxial set. The instruments are formed as toothed scrapers which remove the bark cleanly but destroy the minimum amount of wood. The interior of the drum and the instruments are tapered on the incoming side to assist in directing logs along the axis.

The debarking instruments tend to maintain the log on the central axis. Means are provided for supporting and guiding the logs along the central axis. There are two sets of roller guides 35 at each end of the drum, each guide set comprising a lower driven roll 36 and an upper roll 37. With two sets of rolls engaging the log at all times it is fed into, through, and away from the drum in a horizontal position without canting.

The lower rolls 36 are mounted on arms 38 pivoted at 39 upon a stand 40. The arms 41 carrying the upper rolls 37 are pivoted on the same centers. The lower arms and rolls are counter-balanced by weights 42 carried on cables 43 passing over pulleys 44. The weights are sufficient to support the log and upper rolls and arms as well as lower rolls and arms. Springs 45 are attached to the counterweights to assist in supporting logs of larger size. The upper rolls are pressed down by weights 46, included with the upper rolls in the counter-balance arrangement. Stops 44a limit the upward movement of the lower rolls so they will not move above the central axis.

The lower rolls are driven by motors M1 having shafts coaxial with the pivots 39. One motor drives the rolls of two sets, the drive being effected through belts 47 and suitable pulleys 48, 48 on the motor and roll shafts. The arms 38 of the lower rolls are adjustable in length, as at 50, to keep the belts 47 tight.

The upper rolls 37 are concave along their length. The lower rolls 36 are divided, having two inner disks 51 with spikes 36' for guiding the log and two outer smooth disks 52 upon which the beveled ends of the upper roll rest when a log is not present. This prevents end play between the rolls.

It is thus seen that the invention provides a very simple, sturdy and efficient de-barking device which will operate at high speed and operate upon knotty and crooked logs with substantially the same facility as upon straight logs. The logs in both guides and drum are resiliently urged to a central axial position where the operation is most effective and least vibratory.

While one embodiment of the invention has been described for purposes of illustration it is to be understood that there may be various other embodiments within the limits of the prior art and the scope of the subjoined claims.

I claim:

1. A de-barker, comprising in combination, a rotary drum provided with de-barking instruments, and log guide means at one end of said drum, said guide means including upper and lower pivoted arms carrying guide rolls, one of which rolls is power driven, weights urging said rolls toward the central axis, and spring means disposed to partially support the lower roll.

2. A de-barker, comprising in combination, a rotary drum provided with de-barking instruments, and log guide means at one end of said drum, said guide means including upper and lower guide rolls biased toward the central axis, the upper roll resting upon the lower roll when no log is present between the rolls, the lower roll being more strongly biased toward the axis than the upper roll to support the weight of a log and the upper roll, means for adding biasing force to the lower roll as it moves away from the axis, and means to limit the upward movement of the lower roll so it will not move above the axis.

3. Apparatus as set forth in claim 2 which includes supporting flanges on the lower roll for rotatably carrying the upper roll when no log is present, and other flanges for carrying a log when present.

4. A de-barker, comprising in combination, a rotary drum provided with de-barking instruments, and a plurality of sets of log guide means at each end of the drum, each set including upper and lower rolls mounted on pivoted arms, means urging said rolls together toward the axis along which the log passes, said lower roll being more strongly urged toward the log axis whereby to support the upper roll and part of the weight of the log.

AUXILIUS P. SCHNYDER.

REFERENCES CITED

The following references are of record in the file of this patent:

UNITED STATES PATENTS

| Number | Name | Date |
|---|---|---|
| 397,114 | Dolsen | Feb. 5, 1889 |
| 572,948 | Beals | Dec. 15, 1896 |
| 997,167 | Werth | July 4, 1911 |
| 1,248,700 | Olson | Dec. 4, 1917 |
| 1,539,603 | Saprones | May 26, 1925 |
| 1,591,017 | Cook | July 6, 1926 |
| 1,887,908 | Tidblad | Nov. 15, 1932 |

FOREIGN PATENTS

| Number | Country | Date |
|---|---|---|
| 40,582 | Denmark | July 26, 1929 |